(12) United States Patent
Dempsey et al.

(10) Patent No.: US 12,113,934 B1
(45) Date of Patent: Oct. 8, 2024

(54) SYSTEMS AND METHODS FOR INTELLIGENT CALL AGENT EVALUATIONS

(71) Applicant: FMR LLC, Boston, MA (US)

(72) Inventors: Bryan Dempsey, Raleigh, NC (US);
Saquib Ilahi, Bellingham, MA (US);
Jenson Joy, North Attleboro, MA (US);
Nirupam Sarkar, Westford, MA (US);
Murad Maayah, Morrisville, NC (US);
Abigail Parker, Cary, NC (US);
Meagan Gilbert, Durham, NC (US);
Derek Kaschl, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/626,879

(22) Filed: Apr. 4, 2024

(51) Int. Cl.
| | |
|---|---|
| *H04M 3/51* | (2006.01) |
| *G09B 5/02* | (2006.01) |
| *G10L 15/18* | (2013.01) |
| *G10L 15/183* | (2013.01) |
| *H04M 3/42* | (2006.01) |

(52) U.S. Cl.
CPC ............ *H04M 3/5175* (2013.01); *G09B 5/02* (2013.01); *G10L 15/1815* (2013.01); *G10L 15/183* (2013.01); *H04M 3/42221* (2013.01); *H04M 2201/405* (2013.01); *H04M 2201/42* (2013.01);
(Continued)

(58) Field of Classification Search
CPC .......... H04M 3/5175; H04M 3/42221; H04M 2201/405; H04M 2201/42; H04M 2203/401; H04M 2203/403; G10L 15/1815; G10L 15/183; G09B 5/02
See application file for complete search history.

(56) References Cited

U.S. PATENT DOCUMENTS

| | | |
|---|---|---|
| 8,135,579 B2 | 3/2012 | Kummamuru et al. |
| 10,750,018 B2 | 8/2020 | Raanani et al. |

(Continued)

OTHER PUBLICATIONS

Krishna et al., Genaudit: Fixing Factual Errors in Language Model Outputs with Evidence, 2024, arXiv, whole document (Year: 2024).*

(Continued)

*Primary Examiner* — Sonia L Gay
(74) *Attorney, Agent, or Firm* — Cesari and McKenna, LLP

(57) ABSTRACT

A computer-implemented method is provided for quantitative performance evaluation of a call agent. The method comprises converting an audio recording of a call between the call agent and a customer to a text-based transcript and identifying at least one topic for categorizing the transcript. The method also includes retrieving a set of criteria associated with the topic. Each criterion correlates to a set of predefined questions for interrogating the transcript to evaluate the performance of the call agent with respect to the corresponding criterion. Each question captures a sub-criterion under the corresponding criterion. The method further includes inputting the predefined questions and the transcript into a trained large language model to obtain scores for respective ones of the predefined questions. Each score measures a degree of satisfaction of the performance of the call agent during the call with respect to the sub-criterion captured by the corresponding predefined question.

19 Claims, 8 Drawing Sheets

(52) U.S. Cl.
CPC ............... *H04M 2203/401* (2013.01); *H04M 2203/403* (2013.01)

(56) References Cited

U.S. PATENT DOCUMENTS

| | | | |
|---|---|---|---|
| 2015/0154956 A1* | 6/2015 | Brown | G06F 16/353 |
| | | | 704/235 |
| 2021/0344636 A1* | 11/2021 | Martin | G06F 40/30 |
| 2023/0007124 A1* | 1/2023 | Krucek | G10L 15/1815 |
| 2023/0068878 A1 | 3/2023 | Dwivedi et al. | |
| 2023/0223016 A1 | 7/2023 | Konam et al. | |
| 2023/0274093 A1 | 8/2023 | Kumar et al. | |
| 2023/0274094 A1 | 8/2023 | Tunstall-Pedoe et al. | |
| 2023/0315983 A1 | 10/2023 | Seth et al. | |
| 2023/0320642 A1 | 10/2023 | Lin | |
| 2023/0394169 A1* | 12/2023 | Ganong, III | G10L 15/22 |

OTHER PUBLICATIONS

Sachdeva et al., Tailored Real-Time Call Summarization System for Contact Centers, 2023, Interspeech, whole document (Year: 2023).*

Level AI, The Future of QA is Here Meet QA-GPT, 2023, Level AI, whole document (Year: 2023).*

Gonzalez, Aldo, "New Feature: AI Call Log Transcription Analysis," Client Support Software, Retrieved from the Internet: <https://www.clientsupportsoftware.com/new-feature-ai-call-log-transcription-analysis/>, May 9, 2023, pp. 1-5.

Vale, Mark, "Sentiment Analysis of Phone Calls Using ChatGPT Now Available in Callroute," Sip Synergy Ltd., Callroute, callroute.com, Retrieved from the Internet: <https://callroute.com/tech-blog/sentiment-analysis-phone-calls- chatgpt/>, Apr. 19, 2023, pp. 1-9.

* cited by examiner

FIG. 4

SYSTEMS AND METHODS FOR INTELLIGENT CALL AGENT EVALUATIONS

BACKGROUND

Technical Field

This application generally relates to systems, methods and apparatuses, including computer program products, for automatically evaluating the performance of a call agent.

Background Information

Agent call evaluations are generally costly, manual and random in nature. As an example, an organization often would only have sufficient resources to evaluate about 2% of 50 million customer service calls made annually. In addition, there are hundreds of variations in the models/approaches adopted by companies to evaluate these calls. Currently, evaluators/coaches lack insights into call agent performance trends.

Therefore, there is a need to create a unified scoring model for standardization of call agent evaluation and call calibration. This can lead to increased agent performance on core qualities and agent compliance skills across an organization. This can also reduce agent errors and time for error detection.

SUMMARY

The present invention features an automated, artificial intelligence (AI) based approach for call evaluations, which can unlock new insights into customer interactions and agent performance on quality and compliance standards. By intelligently analyzing call recordings and transcripts, the instant approach can generate automatic call summarization, agent evaluations, strengths and opportunities identification and performance enhancement (e.g., verbiage) suggestions.

In one aspect, the present invention features a computer implemented method for quantitative performance evaluation of a call agent. The method includes receiving, by a computing device, an audio recording of a call between the call agent and a customer, converting, by the computing device, the audio recording to a text-based transcript, and identifying, by the computing device, at least one topic for categorizing the transcript by comparing the transcript to a list of historical call topics. The method also includes retrieving, by the computing device, a set of criteria associated with the at least one topic. Each criterion correlates to a set of predefined questions for interrogating the transcript to evaluate the performance of the call agent with respect to the corresponding criterion, and each question captures a sub-criterion under the corresponding criterion. The method further includes inputting, by the computing device, the predefined questions and the transcript into a trained large language model (LLM) to obtain scores for respective ones of the predefined questions. Each score measures a degree of satisfaction of the performance of the call agent during the call with respect to the sub-criterion captured by the corresponding predefined question. The method additionally includes calculating, by the computing device, a combined score for the call agent based on the scores for the predefined questions. The combined score represents an overall degree of satisfaction of the performance of the call agent with respect to the at least one topic identified for the call. The computing device can present, via a graphical user interface, an identification of the call agent, a link to the audio recording of the call, the topic identified, and the combined score that quantitatively evaluates the performance of the call agent during the call.

In another aspect, the present invention features a computer-implemented system for quantitative performance evaluation of a call agent. The computer-implemented system comprises a computing device having a memory for storing instructions that when executed configure the computer-implemented system to provide a transcript processing module, a preprocessing module, a scoring module and a postprocessing module. The transcript processing module is configured to receive an audio recording of a call between the call agent and a customer and convert the audio recording to a text-based transcript. The preprocessing module is configured to (i) identify at least one topic for categorizing the transcript by comparing the transcript to a list of historical call topics and (ii) retrieve from a database a set of criteria associated with the at least one topic. Each criterion correlates to a set of predefined questions for interrogating the transcript to evaluate the performance of the call agent with respect to the corresponding criterion, and each question captures a sub-criterion under the corresponding criterion. The scoring module is configured to receive as inputs the predefined questions and the transcript and generate as outputs scores for respective ones of the predefined questions using a trained large language model (LLM). Each score measures a degree of satisfaction of the performance of the call agent during the call with respect to the sub-criterion captured by the corresponding predefined question. The postprocessing module is configured to calculate a combined score for the call agent based on the scores for the predefined questions, where the combined score represents an overall degree of satisfaction of the performance of the call agent with respect to the at least one topic identified for the call. The postprocessing module is also configured to cause to display, via a graphical user interface, an identification of the call agent, a link to the audio recording of the call, the topic identified, and the combined score that quantitatively evaluates the performance of the call agent during the call.

Any of the above aspects can include one or more of the following features. In some embodiments, the graphical user interface is configured to display a summary of the call generated based on the transcript, the summary describing an issue identified during the call and a resolution to the identified issue. In some embodiments, the summary is at least one of (i) generated by the LLM that uses the at least one topic identified to summarize the call, or (ii) based on a pattern determined from content of historical calls involving the call agent or the customer.

In some embodiments, evidence from the transcript is extracted for each predefined question, where the evidence is a part of the transcript from which the LLM derived the score in response to the corresponding predefined question. The extract evidence is compared against the transcript to determine a degree of match and the score generated for the predefined question is rejected if the degree of match is below a predefined threshold. In some embodiments, the comparison is performed using a statistical sentence comparison technique.

In some embodiments, the LLM automatically generates a performance coaching recommendation for the agent under each criterion based on a combination of the scores generated for the set of predefined questions under that criterion and the evidence extracted for the set of predefined questions. In some embodiments, the performance coaching recommendation includes identification of one or more strengths of the call agent, identification of one or more opportunities for improvement, and verbiage suggestions for the call agent. In some embodiments, generating the performance coaching recommendation comprises inputting into the LLM (i) the scores generated for the predefined questions, (ii) the evidence from which the scores are derived and (iii) a prompt asking the LLM to use the scores and the evidence to provide the performance coaching recommendation. In some embodiments, the LLM automatically monitors and identifies a performance pattern of the call agent based on a plurality of the performance coaching recommendations for the agent generated over time.

In some embodiments, ratings are collected over time for the performance coaching recommendation, where the ratings represent a ground truth dataset. A summary of the call transcript is also automatically generated by the LLM. The ground truth dataset is used to automatically determine accuracy of the LLM for generating the scores to the predefined questions. In some embodiments, one or more of the predefined questions are revised to improve the accuracy of the LLM. In some embodiments, the ratings are automatically generated by the LLM.

In some embodiments, each of the predefined questions is a conditional question that requires a yes or no answer. In some embodiments, converting the audio recording comprises anonymizing the transcript to remove identification information related to the customer and confidential proprietary data. In some embodiments, the at least one topic identified comprises at least one of a variable topic, a fixed topic or a periodic topic.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 shows another graphical user interface (GUI) generated by the call agent evaluation system of FIG. 1 for displaying evaluation results related to multiple call agents, according to some embodiments of the present invention.

DETAILED DESCRIPTION

Figure 1:
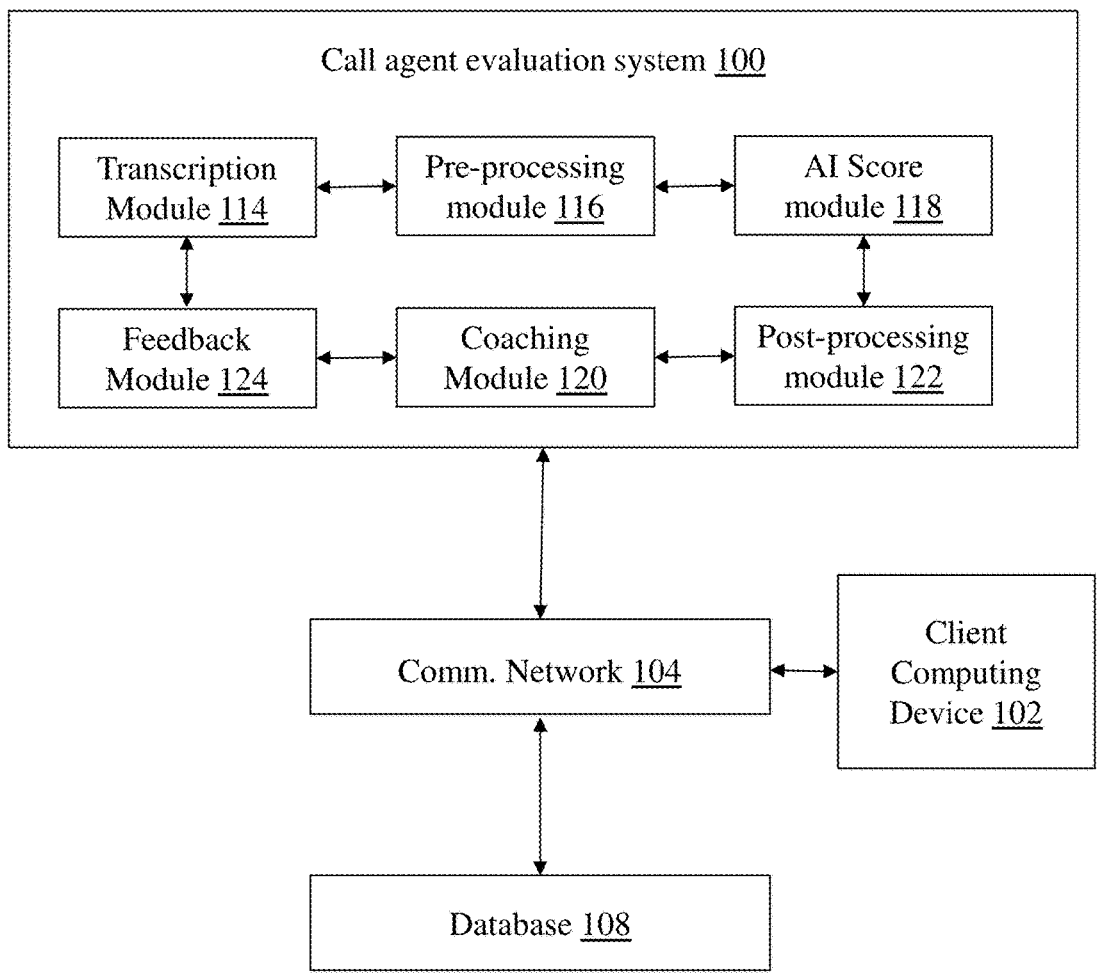
FIG. 1 shows an exemplary diagram of an automated call agent evaluation system, according to some embodiments of the present invention.

FIG. 1 shows an exemplary diagram of an automated call agent evaluation system 100 used in a computing environment 101 for automatically evaluating the performance of call agents in an organization, according to some embodiments of the present invention. As shown, computing environment 101 generally includes at least one client computing device 102, a communication network 104, the call agent evaluation system 100, and at least one database 108.

The client computing device 102 can be associated with a user, such as a coach, who would like to determine the performance of one or more call agents. The client computing device 102 can connect to the communication network 104 to interact with the evaluation system 100 and/or the database 108 to provide inputs and receive outputs for display to the user. For example, the computing device 102 can provide one or more detailed graphical user interfaces (GUI) that display evaluation scores and pertinent details for one or more call agents using the methods and systems described herein. Exemplary computing devices 102 include, but are not limited to, telephones, desktop computers, laptop computers, tablets, mobile devices, smartphones, and internet appliances. It should be appreciated that other types of computing devices that are capable of connecting to the components of the computing environment 101 can be used without departing from the scope of invention. Although FIG. 1 depicts a single computing device 102, it should be appreciated that the computing environment 101 can include any number of client devices for communication by any number of users.

The communication network 104 enables components of the computing environment 101 to communicate with each other to perform the process of call agent evaluation. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The evaluation system 100 is a combination of hardware, including one or more processors and one or more physical memory modules and specialized software engines that execute on the processor of the evaluation system 100, to receive data from other components of the computing environment 101, transmit data to other components of the computing environment 101, and perform functions as described herein. As shown, the evaluation system 100 executes a transcription module 114, a preprocessing module 116, an artificial intelligence (AI) score module 118, a coaching module 120, a post-processing module 122 and a feedback module 124. These sub-components and their functionalities are described below in detail. In some embodiments, the various components of the evaluation system 100 are specialized sets of computer software instructions programmed onto a dedicated processor in the evaluation system 100 and can include specifically designated memory locations and/or registers for executing the specialized computer software instructions.

The database 108 is a computing device (or in some embodiments, a set of computing devices) that is coupled to and in communication with the evaluation system 100 and is configured to provide, receive and store various types of data received and/or created for evaluating call agent performance. In some embodiments, all or a portion of the database 108 is integrated with the evaluation system 100 or located on a separate computing device or devices. For example, the database 108 can comprise one or more databases, such as MySQL™ available from Oracle Corp. of Redwood City, California.

Figure 2:
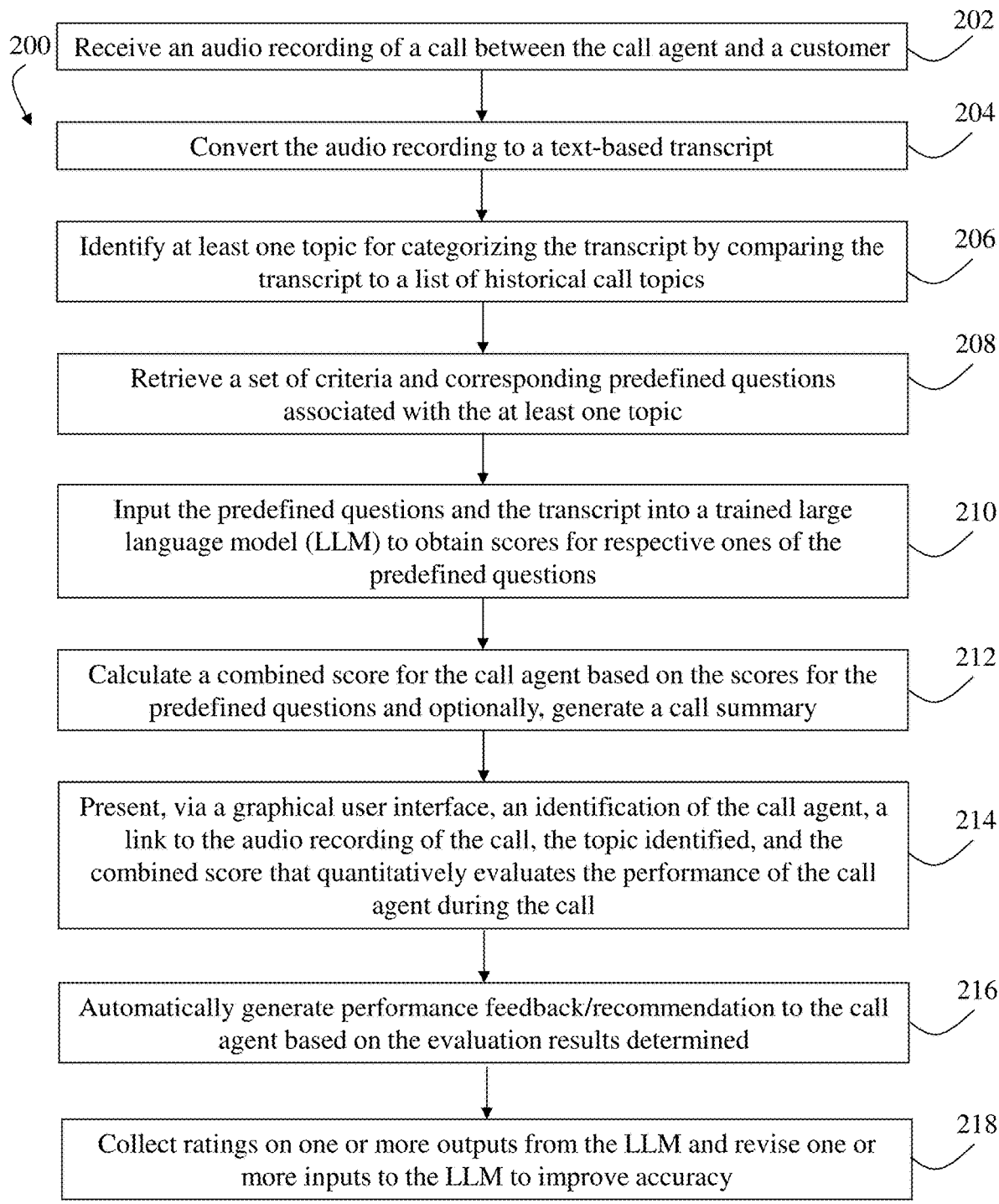
FIG. 2 shows an exemplary process utilized by the evaluation system of FIG. 1 to automatically evaluate the performance of a call agent based on one or more calls monitored, according to some embodiments of the present invention.

FIG. 2 shows an exemplary process 200 utilized by the evaluation system 100 of FIG. 1 to automatically evaluate the performance of a call agent based on one or more calls monitored, according to some embodiments of the present invention. The process 200 starts at step 202 with the evaluation system 100 receiving an audio recording of a call between a customer and a call agent.

At step 204, the speech transcription module 114 of the evaluation system 100 is configured to convert the recorded speech into a digitized text-based transcript. In some embodiments, the speech transcription module 114 utilizes one or more artificial intelligence (AI) speech recognition models (e.g., NeMo by Nvidia) that are built and trained for such speech-to-text conversion. In some embodiments, the speech transcription module 114 implements an anonymization layer to remove certain sensitive data (e.g., confidential proprietary data) from the digital text to allow for safe and secure data analysis while maintaining accurate analytical results. Exemplary confidential proprietary data that can be removed from a transcript includes, but is not limited to, names, social security numbers, organization identifications, etc. The speech transcription module 114 can then forward the anonymized text transcript to the preprocessing module 116 for further processing.

The preprocessing module 116 can perform transcript partition and enhancement activities in further preparation for downstream call transcript analysis. For instance, the preprocessing module 116 can divide the call transcript in halves by word count in preparation for downstream summarization for each of the halves. As another example, the call transcript can be split into chunks (e.g., into thirds) so that downstream contextual scoring of each chunk can be done with less input tokens. In some embodiments, the preprocessing module 116 augments/processes the call transcript to remove non-human transcription text and other artifacts that may be captured during audio recording. At step 206 of process 200, the preprocessing module 116 is configured to identify at least one topic for categorizing the call transcript by comparing the incoming transcript to characteristics corresponding to a list of historical call topics, which may be stored in database 108. As an example, each historical call topic can be associated with one or more keywords, and the preprocessing module 116 is adapted to assign a particular historical call topic to the transcript if the keywords associated with that historical call topic are found in the transcript. In some embodiments, the historical call topics are call agent based, such as lack of agenda for a call or poor transfer language. In some embodiments, the historical call topics are customer based, such as change a password or add a beneficiary. In addition, each assigned topic can be a variable topic, a fixed topic, or a periodic topic. For example, a variable topic can be fraud based, such as reporting a fraud or discussion of a fraudulent activity. A periodic topic can be a topic that is seasonal, such as a topic only pertinent to tax seasons. In general, the trained artificial intelligence model described in detail below can naturally adapt to the topic of a call transcript based on the specific conversation without being tied to any ontology or fixed topic list.

After assigning at least one topic to the incoming transcript, the preprocessing module 116 is configured to retrieve from the database 108 a set of criteria associated with that topic (at step 208 of process 200). Each criterion for a particular topic corresponds to a set of predefined questions for interrogating the transcript to evaluate the performance of the call agent under the corresponding criterion/topic. Thus, each question captures a sub-criterion under the corresponding criterion. Such a two-layered inquiry replaces the traditional decision tree approach, permitting both faster and more accurate call transcript scoring that is more aligned with human subject-matter expert evaluation. The preprocessing module 116 then supplies these predefined questions to the AI score module 118 for processing.

At step 210 of process 200, the AI score module 118 is adapted to input the list of predefined questions for the set of evaluation criteria, along with the call transcript, to a trained artificial intelligence model, such as a large language model (LLM) that uses deep learning techniques and pre-trained large data sets, to predict answers to the questions relative to the call transcript. In some embodiments, the AI score module 118 generates a score for each answer determined by the LLM, where the score quantitatively measures a degree of satisfaction/compliance of the call agent during the call (as captured by the call transcript) with respect to the sub-criterion of the corresponding predefined question. In some embodiments, the LLM uses a zero-shot learning approach to generate the answer to a question without being provided with additional labeled data for the question, in which case the AI score module 118 only inputs the questions and the call transcript to the LLM, where the call transcript provides a context, and each question specifies a desired output. This zero-shot technique permits more flexibility, less time for model setup, and more focus on question tuning as opposed to AI model tuning.

In some embodiments, each of these predefined questions is a conditional question that requires a yes or no answer from the LLM. Thus, the AI score module 118 is adapted to assign a score of 100 to a yes answer from the LLM, and a score of 0 to a no answer from the LLM. An exemplary question to input to the LLM model can be "Based on the transcript provided, check to see if the agent performed the following quality criteria (input criteria). Provide a yes or no response and evidence as needed." In addition to outputting an answer to a question, the LLM can also, in some embodiments, extract and output evidence from the transcript (e.g., a portion of the transcript) from which the LLM derived the answer in response to the corresponding question. In some embodiments, the AI score module 118 is further configured to, for each question answered, compare the extracted evidence against the original transcript to determine a degree of match, thereby ensuring that there is no hallucination in the response process. This matching can be performed using a statistical sentence comparison technique. If the match result is below a predefined threshold, the AI score module 118 can reject the answer generated for that question.

At step 212, the postprocessing module 122 is configured to calculate an overall score for the call agent based on the scores for the predefined questions generated by the AI score module 118. This overall score represents an overall degree of satisfaction of the performance of the call agent with respect to the topic identified for the call from step 206. In some embodiments, as an intermediate step for each criterion, the postprocessing module 122 averages the scores for all the questions under that criterion, and the resulting averaged score reflects the performance of the call agent with respect to that particular criterion. In some embodiments, the final calculated score is a weighted average with some questions receiving more weights than others. In general, the postprocessing module 122 is flexible in terms of computing the scores to accommodate different business logics. For example, the postprocessing module 122 can compute a hierarchy of scores that include one or more overall topic-level scores, one or more criteria-level scores underneath each topic, and one or more LLM question-level scores underneath each criterion. Any types and/or rules, optional or required tags, and/or weighted preferences can be applied at each hierarchical level of scores to determine the overall score.

In some embodiments, the postprocessing module 122 can utilize the LLM (or another machine learning model) to generate a summary of the call transcript. For example, the postprocessing module 122 can provide as inputs to the LLM (i) the call transcript and (ii) a specific request/prompt to generate a summary for the call transcript. In return, the LLM provides a summary of the call transcript as requested using, for example, the zero-shot technique described above. The summary can describe an issue identified during the call and a resolution to the identified issue. In some embodiments, the summary generated by the LLM is a topic-based summary. To generate such a summary, the postprocessing module 122 first asks the LLM to identify the call topic by supplying as inputs to the LLM the call transcript and the prompt "What is the topic of this call?" In response, the LLM returns the call topic identified from the transcript (e.g., "Hardship Withdrawal"). Alternatively, the call topic can be the same as the topic identified at step 206 of process 200. The postprocessing module 122 can then customize the prompt/question to the LLM by asking the LLM to summarize the call transcript with respect to the business requirements for the call topic identified (e.g., "summarize call and include why a hardship withdrawal is being taken"). In some embodiments, the summary generated by the LLM is a user-based summary, which is typically employed for a frequent customer or call agent to determine a conversation pattern. Using a frequent customer as an example, to generate such a summary, the postprocessing module 122 first retrieves recent calls made by the customer (such as from database 108) and then asks the LLM to summarize each call as well as generate a summary of the summaries creates to determine if there is a pattern to these calls. In some embodiments, the summary generated by the LLM is a recursive summary. To generate such a summary, the postprocessing module 122 can request the LLM to summarize recursively (e.g., on a periodic basis) based on the latest data available. As an example, the postprocessing module 122 can request the LLM to automatically generate user-based summaries for an agent or a customer on a weekly basis including the most recent call data. As another example, the postprocessing module 122 can request the LLM to automatically collect and summarize all calls related to a specific topic on a weekly basis for coaching purposes.

At step 214, the postprocessing module 122 is further configured to present, via a graphical user interface of a user's computing device 102, an identification of the call agent, a link to the audio recording of the call, the one or more call topics identified, and the overall score that quantitatively evaluates the performance of the call agent during the call. In some embodiments, the postprocessing module 122 can also cause to display on the graphical user interface the summary of the call transcript generated by the LLM. Exemplary graphical user interfaces are described below with reference to FIGS. 3-6.

In an optional step 216 of process 200, the coaching module 120 of the call agent evaluation system 100 is configured to automatically generate performance feedback/recommendation to the call agent based on the evaluation results determined. More specifically, coaching recommendations can be automatically generated from a single call involving the call agent based on a combination of the one or more criteria determined for the call (step 208 of process 200), the answers/scores generated for the questions corresponding to each criterion of the one or more criteria (from step 210 of process 200), and the evidence extracted in support of the answers (from step 210 of process 200). Such an approach for automatically generating performance recommendations is generally more accurate and involves less risk of hallucinations. In some embodiments, the performance coaching recommendations produced by the coaching module 120 include identification of one or more strengths of the call agent, identification of one or more opportunities for improvement, and verbiage suggestions for the call agent. To generate performance recommendations for the call agent, the coaching module 120 of the call agent evaluation system 100 can provide the LLM (or another AI model) the following inputs: (i) the scores generated for the questions corresponding to the one or more criteria determined for the call, (ii) the evidence from which the scores are derived, (iii) curated examples of actual/historical coaching feedback retrieved from database 108, and (iv) a prompt asking the LLM to use the scores and the evidence to provide performance coaching recommendations in a style similar to the examples provided. An exemplary prompt provided to the LLM can be "You are a coach. Use the completed scorecard plus the coach examples to create a set of call strengths, opportunities, and verbiage suggestions for this call agent," where the scorecard represents answers to criteria combined with evidence supporting the answers obtained earlier. The LLM is adapted to generate, in response to the inputs, identification of strengths, opportunities, and/or verbiage recommendations for the call agent. In some embodiments, the automatic call agent performance feedback is augmented with feedback from human coaches to present a more comprehensive evaluation of the call agent, including more specific areas for improvement.

In some embodiments, the coaching module 120 is configured to instruct the LLM (or another machine learning model) to automatically monitor and identify a performance pattern of the call agent based on historical coaching recommendations for the agent generated over time. An exemplary input prompt to the LLM can be "create a brief set of coaching notes based on this agent's previous call evaluations to identify performance patterns." An exemplary output from the LLM can be a brief set of coaching notes with patterns highlighted and described.

In another optional step 218 of process 200, the feedback module 124 of the call agent evaluation system 100 is configured to collect ratings on certain outputs produced by the LLM, including, but are not limited to, (i) the scores to the questions under one or more criteria for evaluating the call agent generated by the LLM at step 210, (ii) the summaries of call transcripts generated by the LLM at step 212, and/or (iii) the performance coaching recommendations generated by the LLM at step 216. These ratings represent a ground truth database that can be used by the feedback module 124 to fine tune, in a feedback loop, various inputs to the LLM to improve evaluation accuracy.

Figure 8:
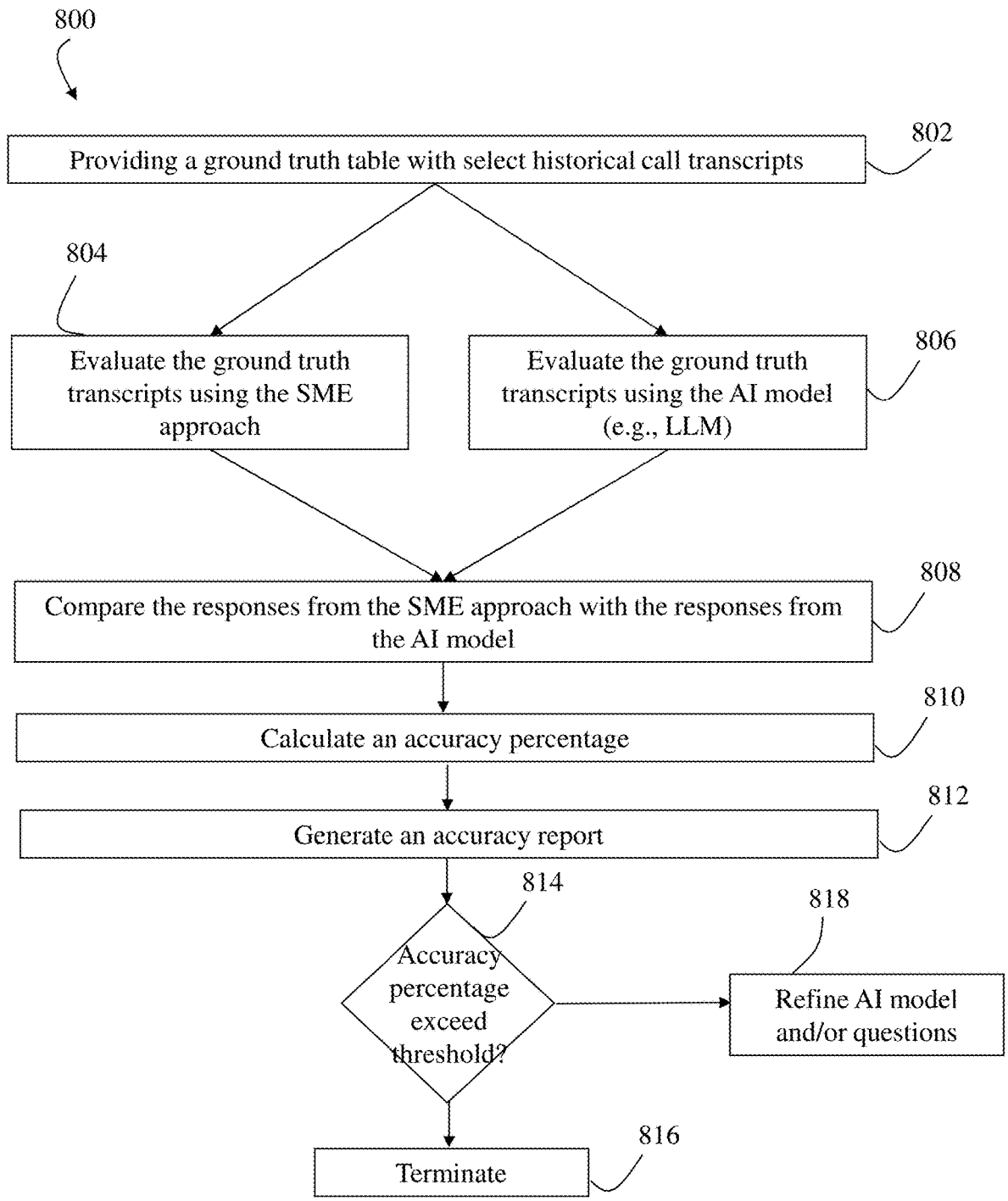
FIG. 8 shows an exemplary process implemented by the feedback module of the call agent evaluation system of FIG. 1 for refining questions for querying the machine learning model used in the process of FIG. 2, according to some embodiments of the present invention.

FIG. 8 shows an exemplary process 800 implemented by the feedback module 124 of the call agent evaluation system 100 of FIG. 1 for refining questions used to query the machine learning model of process 200 of FIG. 2, according to some embodiments of the present invention. At step 802, a ground truth table is provided that includes select historical call transcripts for evaluating the accuracy of the AI model (e.g., the LLM) used in process 200 of FIG. 2. At step 804, the ground truth transcripts are scored by human coaches with respect to questions under one or more criteria, where the criteria and their corresponding questions can be obtained using the approach described above with respect to step 206 of process 200 of FIG. 2. Hereinafter, this is referred to as the SME approach for evaluating transcripts. The outputs from the SME approach can be yes, no, or N/A answers recorded by human coaches when evaluating the ground truth transcripts using the set of criteria/questions. At step 806, these ground truth transcripts are automatically scored using a machine learning model, such as the LLM used at step 210 of process 200 of FIG. 2 under the same set of criteria/questions as those used by the human evaluators at step 804 of the SME approach. The AI model outputs can comprise yes or no answers automatically generated by the AI model in response to the set of criteria/questions. Therefore, the same set of transcripts are evaluated by at least two different sources-human and machine. Based on these two sources of responses, the feedback module 124 can compare them at step 808 by utilizing, for example, the Pearson's rank co-relation technique to generate a matrix that quantifies how close the human and machine responses are to each other. In some embodiments, the feedback module 124 also records on which questions the AI model generates matching responses as the SME approach and on which questions the responses differ. In general, if the two groups of responses are not close, this indicates that the AI model (e.g., the LLM) is not good enough to evaluate a call agent in most cases and needs improvement. However, if the two groups of scores are close, it indicates that the AI model is accurate and can be used to generate evaluations with high quality most of the time.

At step 810, the feedback module 124 is configured to determine an accuracy percentage by calculating out of the total number of ground truth transcripts used in process 800, the percentage of times the AI model generates matching responses compared to the SME approach. Optionally, at step 812, the feedback module 124 can generate an accuracy report that includes one or more of the content/ID of the transcripts used, a breakdown of accuracy percentages under corresponding criteria, the responses generated by the AI model and/or from the SME approach, and the percentage of conformity to human responses for the AI model responses. At step 814, the feedback module 124 is configured to compare the accuracy percentage generated at step 806 with a predefined threshold accuracy. If the accuracy percentage exceeds the threshold, that means the AI model and the criteria/questions used by process 200 to evaluate a call agent are sufficiently accurate such that no fine tuning is required and process 800 terminates at step 816. Alternatively, if the accuracy percentage is below the threshold, it means that the AI model and/or the criteria/questions used by process 200 to evaluate a call agent should be flagged for further review and analysis. For example, using the accuracy report of step 812, the feedback module 124 can identify drifts in questions and refine the questions accordingly at step 818.

In some embodiments, process 800 is repeated with the refined questions for the AI model until the threshold accuracy is satisfied. In some embodiments, by continuously (or periodically) executing process 800 over time, the feedback module 124 of the evaluation system 100 can detect machine learning drift as well as adopt new or revised models, prompts and/or questions For example, the feedback module 124 can (i) update the questions curated under each criterion to improve evaluation of agent performance and/or (ii) the prompts used to query the machine learning model (e.g., the LLM) to improve accuracy for the scoring algorithm, call summaries and/or coaching recommendations.

Figure 3:
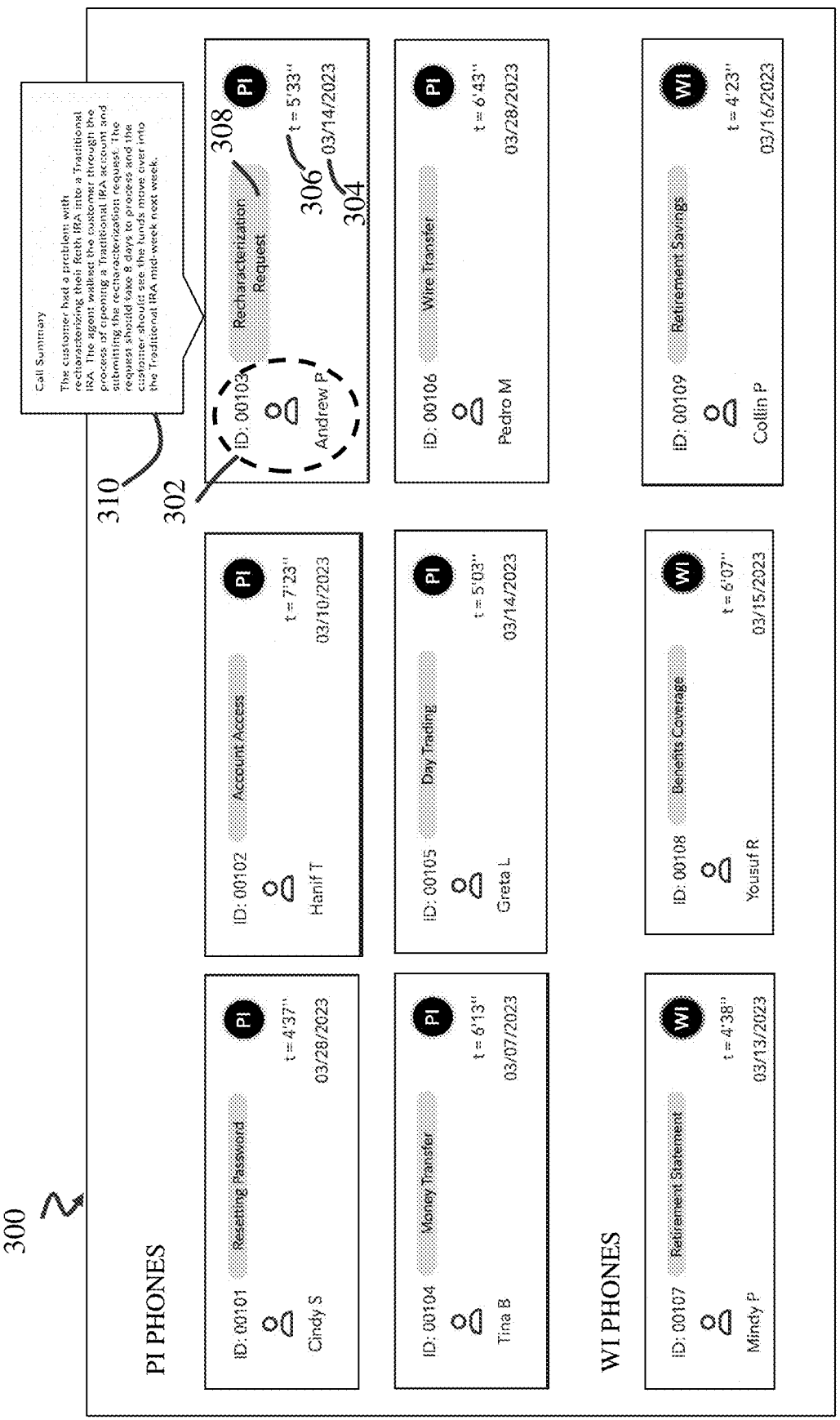
FIG. 3 shows an exemplary graphical user interface (GUI) generated by the call agent evaluation system of FIG. 1 for displaying evaluation results related to multiple call agents, according to some embodiments of the present invention.

FIG. 3 shows an exemplary graphical user interface (GUI) 300 generated by the call agent evaluation system 100 of FIG. 1 for displaying evaluation results related to multiple call agents, according to some embodiments of the present invention. The GUI 300 can be generated by the post-processing module 122 at step 214 of process 200, as described above with reference to FIG. 2. As shown, the GUI 300 is configured to identify each call agent and his/her employee identification 302, along with call related information, including the time of the call 304, the length of the call 306, and the topic of the call 308, as determined at step 206 of process 200 described above. In some embodiments, if the viewer hovers over a call topic 308, a summary of the call 310 can be displayed, as determined at step 212 of process 200 described above.

Figure 4:
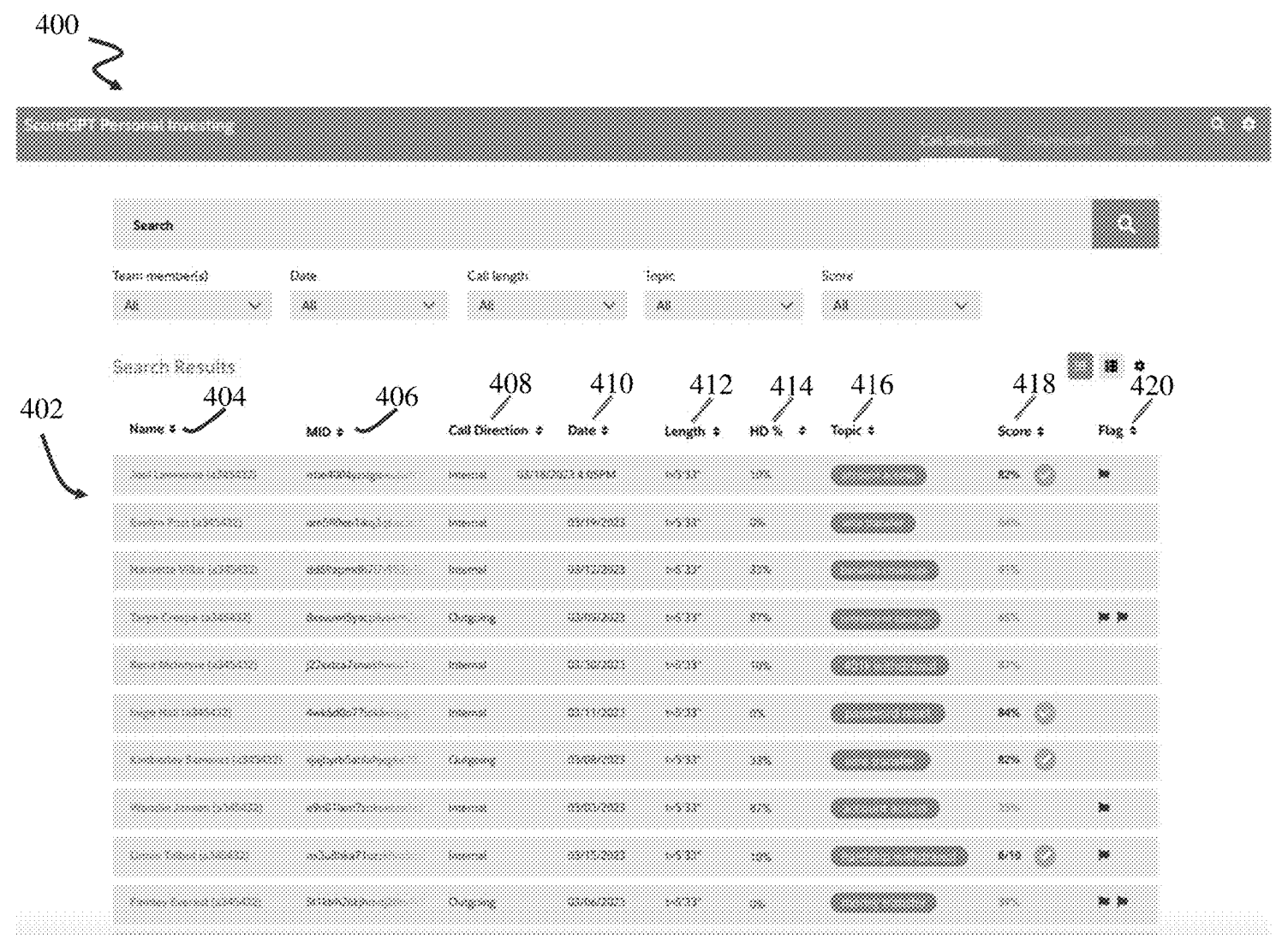

FIG. 4 shows another graphical user interface (GUI) 400 generated by the call agent evaluation system 100 of FIG. 1 for displaying evaluation results related to multiple call agents, according to some embodiments of the present invention. The GUI 400 can be generated by the post-processing module 122 at step 214 of process 200, described above with reference to FIG. 2, and as an alternative to the GUI 300 of FIG. 3. As shown, the GUI 400 displays agent evaluation results in a searchable table format 402. The table 402 includes multiple columns identifying agent names 404, employee identifications 406, call directions 408 (e.g., whether the calls made by the corresponding agents are incoming or outgoing), dates of the corresponding calls 410, lengths of the corresponding calls 412, percentages of the corresponding calls the corresponding agents spent with internal helpdesk versus time spent with the customers 414, topics of the corresponding calls 416, scores determined for the corresponding calls 418 and alerts assigned to the corresponding calls 420. In some embodiments, the call topics 416 are determined at step 206 of process 200 and are clickable by the viewer to bring forth corresponding call summaries (not shown). In some embodiments, the call scores 418 are determined at step 212 of process 200. In some embodiments, the alerts assigned to the corresponding calls 420 are based on comparing the corresponding scores 418 to one or more alert thresholds. For example, if a score 418 is below one or more thresholds, visual flags can be displayed in table 402 and the number of flags can indicate the severity of the alert. In some embodiments, the number of flags represents the number of compliance infractions. Therefore, more flags indicate more errors made by the agent during the call. For example, if an agent did not verify the customer and used non-compliant language, two flags are adapted to be displayed to indicate two infractions.

Figure 5:
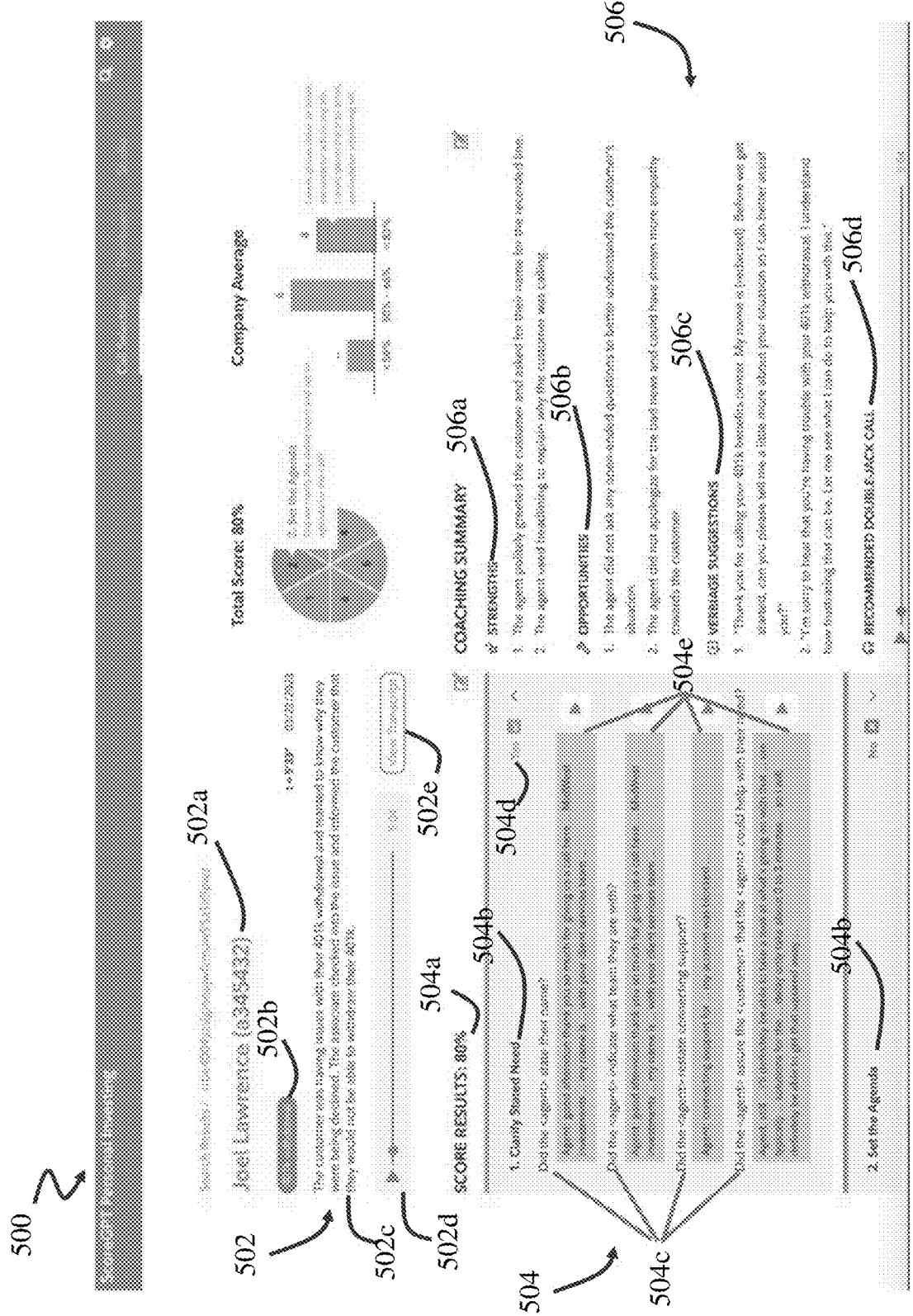
FIG. 5 shows another graphical user interface (GUI) generated by the call agent evaluation system of FIG. 1 for displaying the evaluation details of a call agent with respect to a particular call involving the call agent, according to some embodiments of the present invention.

FIG. 5 shows another graphical user interface (GUI) 500 generated by the call agent evaluation system 100 of FIG. 1 for displaying the evaluation details of a call agent with respect to a particular call involving the call agent, according to some embodiments of the present invention. In some embodiments, the GUI 500 can be evoked by the viewer from GUI 300 of FIG. 3 or GUI 400 of FIG. 4 by clicking on a call agent of interest to drill down on his/her call details. As shown, the GUI 500 includes a call information area 502 that displays an identification of the call agent 502a, a call topic 502b identified (e.g., "401k withdrawal"), a call summary 502c, an audio recording of the call 502d, and a link to the call transcript 502e.

The GUI 500 also includes a score area 504 that displays the overall score 504a for the call, e.g., 80% (as calculated at step 212 of process 200 of FIG. 2), along with a breakdown of the set of criteria 504b used to evaluate the call and the set of predetermined questions 504c under each criterion 504b for interrogating the call transcript (as determined at step 208 of process 200). The score area 504 can also display a set of answers 504d to corresponding ones of the questions 504c, such as conditional yes or no answers, along with the evidence 504e relied upon by the machine learning model to determine the answers 504d (as determined at step 210 of process 200). For example, one evaluation criterion 504b under the topic of "401k withdrawal" 502b can be "clarify stated need." For this criterion 504b, one of the questions 504c to ask the transcript can be "did the <agent> state their name?" To determine the answer to this question, the machine learning model used can rely as evidence on the section of the transcript 504e where the agent said "good afternoon thank you so much for giving us a call here . . . MidWest Investments . . . my name is . . . with your client services team . . . " Therefore, the machine learning model can generate an answer 504d of "yes" to this question based on the evidence extracted.

As shown, the GUI 500 also includes a coaching area 506 that displays one or more performance coaching recommendations for the agent under each of the criteria identified (as determined at step 216 of process 200). The performance coaching recommendations can include identification of one or more strengths of the call agent 506a, identification of one or more opportunities for improvement 506b, and verbiage suggestions for the call agent 506c. In some embodiments, the coaching area 506 of the GUI 500 further displays a recommended double-jack call 506d that plays an exemplary call made by another agent (hereinafter referred to as a model agent). To generate the recommended double-jack call 506d, a human-curated database of calls is assessed, and top scoring calls are flagged as "top box" calls. These top-box calls are then automatically analyzed and recommended, using an AI model, with respect to the call performance of the agent being evaluated. For example, if the agent being evaluated struggles with the criterion of Setting an Agenda for the call, the AI model is configured to recommend a top box call during which the model agent involved in the call did a great job meeting that criterion. In some embodiments, the AI model uses exiting tags on the data and the call transcript to determine the best match between the top-box calls and the scorecard/performance of the agent being evaluated.

Figure 6:
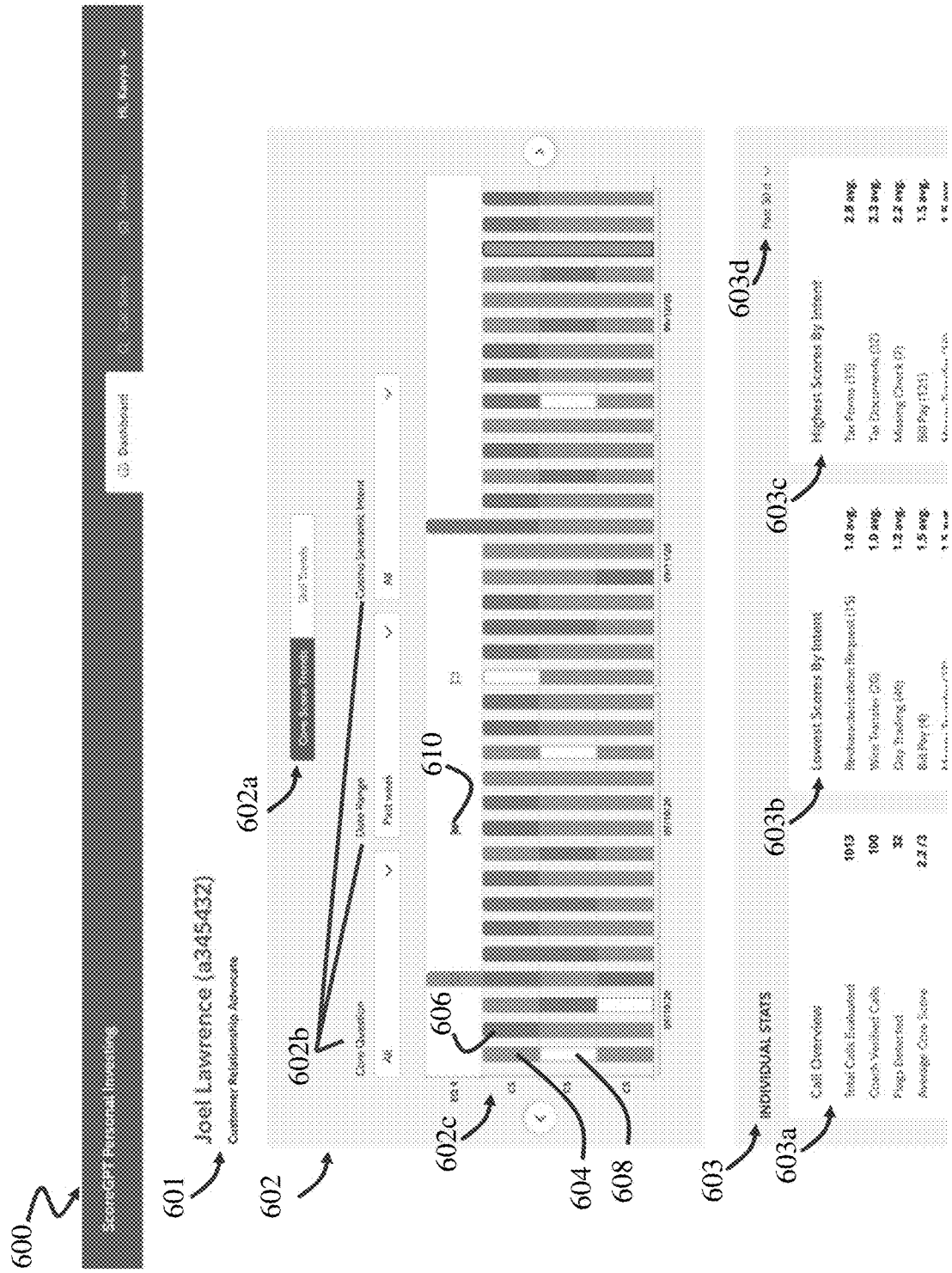
FIG. 6 shows yet another graphical user interface (GUI) generated by the call agent evaluation system of FIG. 1 for displaying score performance and related details of an individual agent, according to some embodiments of the present invention.

FIG. 6 shows yet another graphical user interface (GUI) 600 generated by the call agent evaluation system 100 of FIG. 1 for displaying score performance and related details for an individual call agent, according to some embodiments of the present invention. In some embodiments, the GUI 600 can be evoked by the viewer from GUI 300 of FIG. 3 or GUI 400 of FIG. 4 by clicking on a call agent of interest to drill down on his/her call details. As shown, the GUI 600 can display an identification of the call agent 601, including employee badge number and human resources title. The GUI 600 can also display a graph area 602 with options 602a for togging between (i) a visualization of the agent's score performance trends, segmented by question, over a selected period of time and (ii) the skill performance trend of the agent over a selected period of time. The graph area 602 also includes menus 602b for allowing a user to filter evaluation results of the call agent in three categories: Core Score Question (options following the three-level question scoring model described above with reference to FIG. 2), Date Range (e.g., past week, past 30 days, past 60 days, past 90 days), and Cosmo Semantic Intent (topics provided by customers describing the nature of the calls). The graph area 602 further includes a visualization interface 602c that illustrates trends in multiple evaluation scores generated by the call evaluation system 100 over a specific period of time. For example, trend 604 indicates successful performance of a question, trend 606 indicates unsuccessful performance of a question, and trend 608 indicates no score available. Flag 610 indicates a potential missed verification by the agent.

The GUI 600 can further include a display area 603 configured to display the call agent's statistics within a selected period of time. As shown, subsection 603a provides call overview statistics, including the number of calls that the evaluation system 100 has analyzed for that particular agent, the number of coach-verified calls, the number of flags (possible missed verification alert) from the agent, and the agent's average score (e.g., generated from the three-level question hierarchy of FIG. 2). Subsection 603b displays the agent's lowest scores by intent, and subsection 603c displays the agent's highest scores by intent. More specifically, the highest and lowest intent scores are generated using the Cosmo Semantic Intents from customer description in menus 602b, which is used to filter the average evaluation scores determined for the agent. Option 603d allows a user to select the desired date range for the three categories of statistics in subsections 603a, 603b and 603c. The date range options can be 30 days, 60 days, and 90 days, with 30 days being the default.

Figure 7:
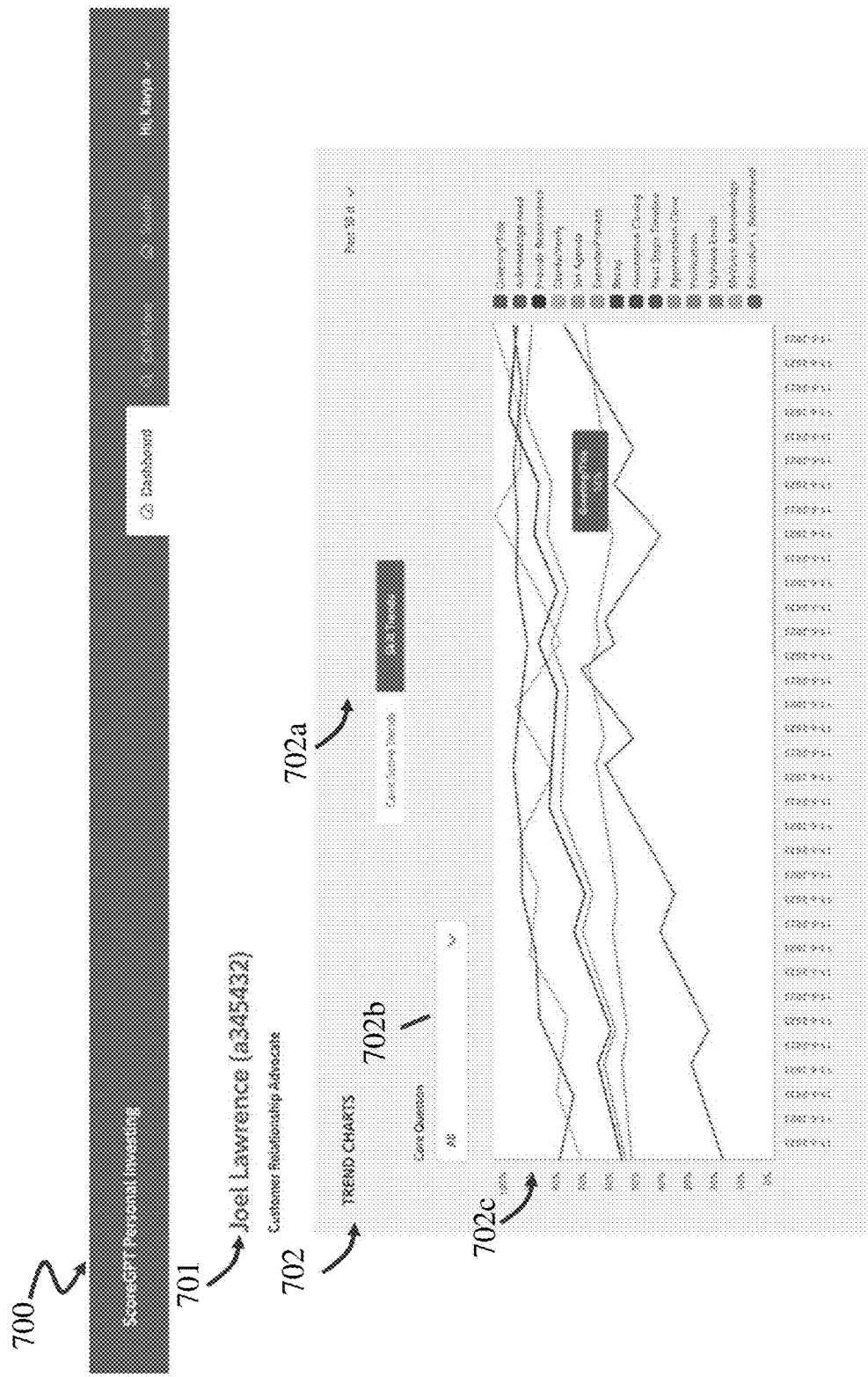
FIG. 7 shows yet another graphical user interface (GUI) generated by the call agent evaluation system of FIG. 1 for displaying skill performance and related details of an individual agent, according to some embodiments of the present invention.

FIG. 7 shows yet another graphical user interface (GUI) 700 generated by the call agent evaluation system of FIG. 1 for displaying skill performance and related details of an individual call agent over the course of a selected range of time, according to some embodiments of the present invention. In some embodiments, the GUI 700 can be evoked by the viewer from GUI 300 of FIG. 3 or GUI 400 of FIG. 4 by clicking on a call agent of interest to drill down on his/her call details. As shown, the GUI 700 can display an identification of the call agent 701, including employee badge number and human resources title. The GUI 700 can also display a graph area 702 with options 702a for togging between (i) a visualization of the agent's score performance trends, segmented by question, over a selected period of time and (ii) the skill performance trends of the agent over a selected period of time. The graph area 702 also includes a drop-down menu 702b for allowing a user to filter evaluation results based on Core Score Question (options following the three-level question scoring model described above with reference to FIG. 2). Each Core Score Question is aligned to a particular skill (e.g., captured by a topic, a criterion or a LLM question described above in FIG. 2). Based on the user selecting an item from the menu 702b, the graph area 702 displays the skills associated with the selected question. For example, a visualization interface 702c in the graph area 702 is configured to illustrate trends of an agent's performance, segmented by skill, over the course of a selected range of time. Each line represents a skill. Each node displays the percentage executing the corresponding skill on a given day. When a user hovers on a node, the visualization interface 702c can display the name of the skill and the percentage correct.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for quantitative performance evaluation of a call agent, the method comprising:
   receiving, by a computing device, an audio recording of a call between the call agent and a customer;
   converting, by the computing device, the audio recording to a text-based transcript;
   identifying, by the computing device, at least one topic for categorizing the transcript by comparing the transcript to a list of historical call topics;
   retrieving, by the computing device, a set of criteria associated with the at least one topic, wherein each criterion correlates to a set of predefined questions for interrogating the transcript to evaluate the performance of the call agent with respect to the corresponding criterion, and wherein each question captures a sub-criterion under the corresponding criterion;
   inputting, by the computing device, the predefined questions and the transcript into a trained large language model (LLM) to obtain scores for respective ones of the predefined questions, wherein each score measures a degree of satisfaction of the performance of the call agent during the call with respect to the sub-criterion captured by the corresponding predefined question;
   extracting, by the computing device, evidence from the transcript for each predefined question, wherein the evidence is a part of the transcript from which the LLM derived the score in response to the corresponding predefined question;
   comparing the extracted evidence against the transcript to determine a degree of match;
   rejecting the score generated for the predefined question if the degree of match is below a predefined threshold;
   calculating, by the computing device, a combined score for the call agent based on the scores for the predefined questions that are not rejected, the combined score representing an overall degree of satisfaction of the performance of the call agent with respect to the at least one topic identified for the call; and
   presenting, by the computing device, via a graphical user interface, an identification of the call agent, a link to the audio recording of the call, the topic identified, and the combined score that quantitatively evaluates the performance of the call agent during the call.

2. The computer-implemented method of claim 1, further comprising displaying, via the graphical user interface, a summary of the call generated based on the transcript, the summary describing an issue identified during the call and a resolution to the identified issue.

3. The computer-implemented method of claim 2, wherein the summary is at least one of (i) generated by the LLM that uses the at least one topic identified to summarize the call, or (ii) based on a pattern determined from content of historical calls involving the call agent or the customer.

4. The computer-implemented method of claim 1, wherein the comparison is performed using a statistical sentence comparison technique.

5. The computer-implemented method of claim 1, further comprising automatically generating, by the LLM, a performance coaching recommendation for the agent under each criterion based on a combination of the scores generated for the set of predefined questions under that criterion and the evidence extracted for the set of predefined questions.

6. The computer-implemented method of claim 5, wherein the performance coaching recommendation includes identification of one or more strengths of the call agent, identification of one or more opportunities for improvement, and verbiage suggestions for the call agent.

7. The computer-implemented method of claim 6, wherein generating the performance coaching recommendation comprises inputting into the LLM (i) the scores generated for the predefined questions, (ii) the evidence from which the scores are derived and (iii) a prompt asking the LLM to use the scores and the evidence to provide the performance coaching recommendation.

8. The computer-implemented method of claim 5, further comprising:
   collecting ratings over time for the performance coaching recommendation and a summary of the call transcript automatically generated by the LLM, wherein the ratings represent a ground truth dataset; and
   using the ground truth dataset to automatically determine accuracy of the LLM for generating the scores to the predefined questions.

9. The computer-implemented method of claim 8, further comprising revising one or more of the predefined questions to improve the accuracy.

10. The computer-implemented method of claim 8, wherein the ratings are automatically generated by the LLM.

11. The computer-implemented method of claim 5, further comprising automatically monitoring and identifying, by the LLM, a performance pattern of the call agent based on a plurality of the performance coaching recommendations for the agent generated over time.

12. The computer-implemented method of claim 1, wherein each of the predefined questions is a conditional question that requires a yes or no answer.

13. The computer-implemented method of claim 1, wherein converting the audio recording comprises anonymizing the transcript to remove identification information related to the customer and confidential proprietary data.

14. The computer-implemented method of claim 1, wherein the at least one topic identified comprises at least one of a variable topic, a fixed topic or a periodic topic.

15. A computer-implemented system for quantitative performance evaluation of a call agent, the computer-implemented system comprising a computing device having a memory for storing instructions, wherein the instructions, when executed, configure the computer-implemented system to provide:

a transcript processing module configured to receive an audio recording of a call between the call agent and a customer and convert the audio recording to a text-based transcript;

a preprocessing module configured to (i) identify at least one topic for categorizing the transcript by comparing the transcript to a list of historical call topics and (ii) retrieve from a database a set of criteria associated with the at least one topic, wherein each criterion correlates to a set of predefined questions for interrogating the transcript to evaluate the performance of the call agent with respect to the corresponding criterion, and wherein each question captures a sub-criterion under the corresponding criterion;

a scoring module configured to:
- receive as inputs the predefined questions and the transcript and generate as outputs scores for respective ones of the predefined questions using a trained large language model (LLM), wherein each score measures a degree of satisfaction of the performance of the call agent during the call with respect to the sub-criterion captured by the corresponding predefined question;
- extract evidence from the transcript for each predefined question, wherein the evidence is a part of the transcript from which the LLM derived the score in response to the corresponding predefined question;
- compare the extracted evidence against the transcript to determine a degree of match;
- reject the score generated for the predefined question if the degree of match is below a predefined threshold; and a postprocessing module configured to:
- calculate a combined score for the call agent based on the scores for the predefined questions that are not rejected, the combined score representing an overall degree of satisfaction of the performance of the call agent with respect to the at least one topic identified for the call; and
- cause to display, via a graphical user interface, an identification of the call agent, a link to the audio recording of the call, the topic identified, and the combined score that quantitatively evaluates the performance of the call agent during the call.

16. The computer-implemented system of claim 15, wherein the postprocessing module is further configured to generate a summary of the call by providing the transcript and the at least one topic identified as inputs into the LLM, wherein the summary describes an issue identified during the call and a resolution to the identified issue.

17. The computer-implemented system of claim 15, further comprising a coaching module configured to, for a select criterion in the set of criteria:

provide, as inputs into the LLM, the scores generated for the set of predefined questions corresponding to the select criterion, the evidence extracted for the set of predefined questions, and a prompt requesting at least one performance coaching recommendation for the agent; and receive, as an output from the LLM, the at least one performance coaching recommendation requested under the select criterion, wherein the performance coaching recommendation includes identification of one or more strengths of the call agent, identification of one or more opportunities for improvement, and verbiage suggestions for the call agent.

18. The computer-implemented system of claim 17, further comprising a feedback module configured to:

collect ratings over time for the at least one performance coaching recommendation and a summary of the call transcript automatically generated by the LLM, wherein the ratings represent a ground truth dataset; and automatically determine accuracy of the LLM for generating the scores to the predefined questions for the select criterion based on the ground truth dataset.

19. The computer-implemented system of claim 18, wherein the feedback module is further configured to revise one or more of the predefined questions to improve the accuracy of the LLM in relation to the select criterion.

* * * * *